United States Patent
Gronau et al.

(10) Patent No.: US 7,140,699 B2
(45) Date of Patent: Nov. 28, 2006

(54) METHOD FOR REGULATING A PREDETERMINED MODIFIABLE BRAKE PRESSURE

(75) Inventors: Ralph Gronau, Wetter (DE); Tobias Scheller, Frankfurt am Main (DE); Ralf Reviol, Dietzenbach-Steinberg (DE); Andreas Neu, Kuhardt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 8 days.

(21) Appl. No.: 10/502,687

(22) PCT Filed: Feb. 13, 2003

(86) PCT No.: PCT/EP03/01444

§ 371 (c)(1),
(2), (4) Date: Jul. 27, 2004

(87) PCT Pub. No.: WO03/068574

PCT Pub. Date: Aug. 21, 2003

(65) Prior Publication Data

US 2005/0082905 A1    Apr. 21, 2005

(30) Foreign Application Priority Data

Feb. 14, 2002   (DE) ................ 102 06 344
May 31, 2002   (DE) ................ 102 24 059

(51) Int. Cl.
*B60T 8/34*   (2006.01)
(52) U.S. Cl. ................... 303/113.4; 303/113.1
(58) Field of Classification Search .. 303/113.1–113.5, 303/116.1–116, 119.1–119.2, 155, 156, 3, 303/15, 20
See application file for complete search history.

(56) References Cited

U.S. PATENT DOCUMENTS

| | | | | |
|---|---|---|---|---|
| 5,560,688 A | * | 10/1996 | Schappler et al. | 303/3 |
| 5,720,534 A | * | 2/1998 | Stumpe | 303/166 |
| 5,934,767 A | * | 8/1999 | Schmidt et al. | 303/119.2 |
| 6,030,055 A | * | 2/2000 | Schubert | 303/113.4 |
| 6,086,167 A | * | 7/2000 | Heckmann et al. | 303/155 |
| 6,238,020 B1 | * | 5/2001 | Gronau et al. | 303/158 |
| 6,345,869 B1 | | 2/2002 | Matsuo et al. | |
| 6,511,137 B1 | * | 1/2003 | Gerdes | 303/156 |
| 6,692,088 B1 | * | 2/2004 | Zheng | 303/113.1 |

(Continued)

FOREIGN PATENT DOCUMENTS

DE    40 30 724 A1    4/1992

(Continued)

OTHER PUBLICATIONS

German Search Report of Application No. 102 24 059.0 dated Jan. 31, 2003.

(Continued)

*Primary Examiner*—Christopher P. Schwartz
(74) *Attorney, Agent, or Firm*—RatnerPrestia

(57) ABSTRACT

The present invention relates to a method for regulating a predetermined modifiable brake pressure in the wheel brakes of a brake system, wherein input quantities determining the brake pressure in the individual wheel brakes are evaluated and correcting variables of hydraulic valves are defined in a control and/or data processing system. To obviate the need for additional pressure sensors which register the pressure in the wheel brakes, it is arranged for by the invention that a characteristic curve is stored in the control or data processing system, said curve correlating the valve characteristics of the hydraulic valve with a pressure difference of the hydraulic valve, and the correcting variable of the hydraulic valve is defined according to the characteristic curve.

8 Claims, 3 Drawing Sheets

U.S. PATENT DOCUMENTS

| | | | |
|---|---|---|---|
| 6,805,415 B1 * | 10/2004 | Isono et al. | 303/122.11 |
| 6,851,764 B1 * | 2/2005 | Giers et al. | 303/115.2 |
| 2001/0028194 A1 | 10/2001 | Isono et al. | |
| 2003/0098613 A1 * | 5/2003 | Bohm et al. | 303/166 |
| 2004/0041466 A1 * | 3/2004 | Giers | 303/20 |
| 2004/0080208 A1 * | 4/2004 | Giers et al. | 303/20 |
| 2004/0150262 A1 * | 8/2004 | Gronau et al. | 303/191 |
| 2005/0168061 A1 * | 8/2005 | Scheller et al. | 303/11 |

FOREIGN PATENT DOCUMENTS

| | | |
|---|---|---|
| DE | 40 37 486 A1 | 5/1992 |
| DE | 41 06 790 A1 | 9/1992 |
| DE | 196 54 427 A1 | 6/1998 |
| DE | 197 07 960 A1 | 9/1998 |
| DE | 199 46 348 A1 | 3/2001 |
| DE | 101 06 464 A1 | 1/2002 |
| DE | 100 62 546 A1 | 6/2002 |
| WO | WO 02/090159 A1 | 11/2002 |

OTHER PUBLICATIONS

International Search Report of Application No. PCT/EP03/01444 dated Jul. 7, 2003.

* cited by examiner

METHOD FOR REGULATING A PREDETERMINED MODIFIABLE BRAKE PRESSURE

FIELD OF THE INVENTION

The present invention relates to a method for regulating a predetermined modifiable brake pressure in the wheel brakes of a brake system, wherein input quantities determining the brake pressure in the individual wheel brakes are evaluated and correcting variables of hydraulic valves are defined in a control and/or data processing system.

BACKGROUND OF THE INVENTION

Vacuum brake boosters require a vacuum supplied by the engine for boosting the pedal force to be generated by the driver. Depending on the engine, even relatively low pedal forces allow reaching a condition where further increase of the force applied to the actuating unit is possible only by an increase in the pedal force because the vacuum brake booster has reached the maximum possible boosting force. This condition is referred to as the point of maximum boosting of the booster. Braking operations that take place in excess of the point of maximum boosting of the vacuum brake booster place high demands on the driver in terms of the pedal force to be generated. For this reason, brake systems (OHB-V) are employed at an increasing rate supporting the driver by means of an active hydraulic brake pressure build-up. Brake systems of this type generally include a motor-and-pump assembly and a hydraulic unit being controlled by an electronic control such as ESP, ABS, TCS, and similar systems, to comply with the desired brake force boosting.

When pressure is built up in the wheel brakes by means of hydraulic boosting beyond the point of maximum boosting of the vacuum brake booster, the (analogized) separating valves are closed, and the hydraulic pump delivers brake fluid from the tandem master cylinder (TMC) into the wheel brakes. In the pressure reduction phase, it is required to discharge the additionally generated pressure into the tandem master cylinder by way of the separating valves in a manner comfortable with respect to pedal feeling and braking effect. This action usually requires two additional pressure sensors at the wheel brakes, one per brake circuit, in order to determine the wheel pressure. The result is a higher requirement of components causing an increase in the system's costs.

SUMMARY OF THE INVENTION

In view of the above, an object of the invention is to provide a method for regulating a predetermined variable brake pressure in the wheel brakes of a brake system, wherein brake pressures can be adjusted according to input quantities without any knowledge about a measured wheel pressure.

According to the invention, this object is achieved in that a characteristic curve is stored in the control or data processing system, said curve correlating the valve characteristics or the valve current of the hydraulic valve with the pressure difference of the hydraulic valve, and the correcting variable of the hydraulic valve is defined according to the characteristic curve. Advantageously, hydraulic boosting of the brake pressure introduced into the brake system is brought about by means of the predetermined variable brake pressure.

It is favorable that the correcting variable is an electric valve current by means of which the hydraulic valve is controlled in analog manner.

With the knowledge of the valve characteristic curve of a separating valve, the tandem maser cylinder pressure and the nominal pressure for the wheel brakes, it is possible to define and adjust a valve current in such a fashion that a defined wheel pressure is achieved, and falling short of said pressure will not occur without the need for additional pressure sensors measuring the wheel pressures.

Advantageously, the correcting variable is determined from the pressure difference between the nominal pressure for the wheel brakes and the pressure of an actuating device (pressure difference of the hydraulic valve). The pressure of the actuating device (TMC=tandem master cylinder) is determined by way of a pressure sensor provided in a brake circuit in an ESP control, and the nominal pressure is determined in a known model.

To reduce leakages, on the one hand, and allow limiting the maximum pressure in response to the situation, on the other hand, at least two strategies are provided for regulating the brake pressure. While the valve current follows the course of the characteristic curve according to the first strategy, the second strategy arranges for jump functions at the maximum actuating current or the actuating current represented by the characteristic curve. The maximum actuating current is limited corresponding to a function according to $I_{max}=f(P_{max}, P_{TMC}, P_{PLV})=\min(P_{max}, P_{TMC}, P_{PLV})$ (PLV=pressure limiting valve).

A device of the invention for implementing the method is designed so that the brake pressure generated by actuation of a pump is controlled in such a way that a desired hydraulic boosting of the introduced brake pressure is achieved in each brake circuit.

BRIEF DESCRIPTION OF THE DRAWING

An embodiment of the invention is illustrated in the accompanying drawings and will be described in detail in the following.

In the drawings.

DETAILED DESCRIPTION OF THE PREFERRED EMBODIMENTS

Figure 1:
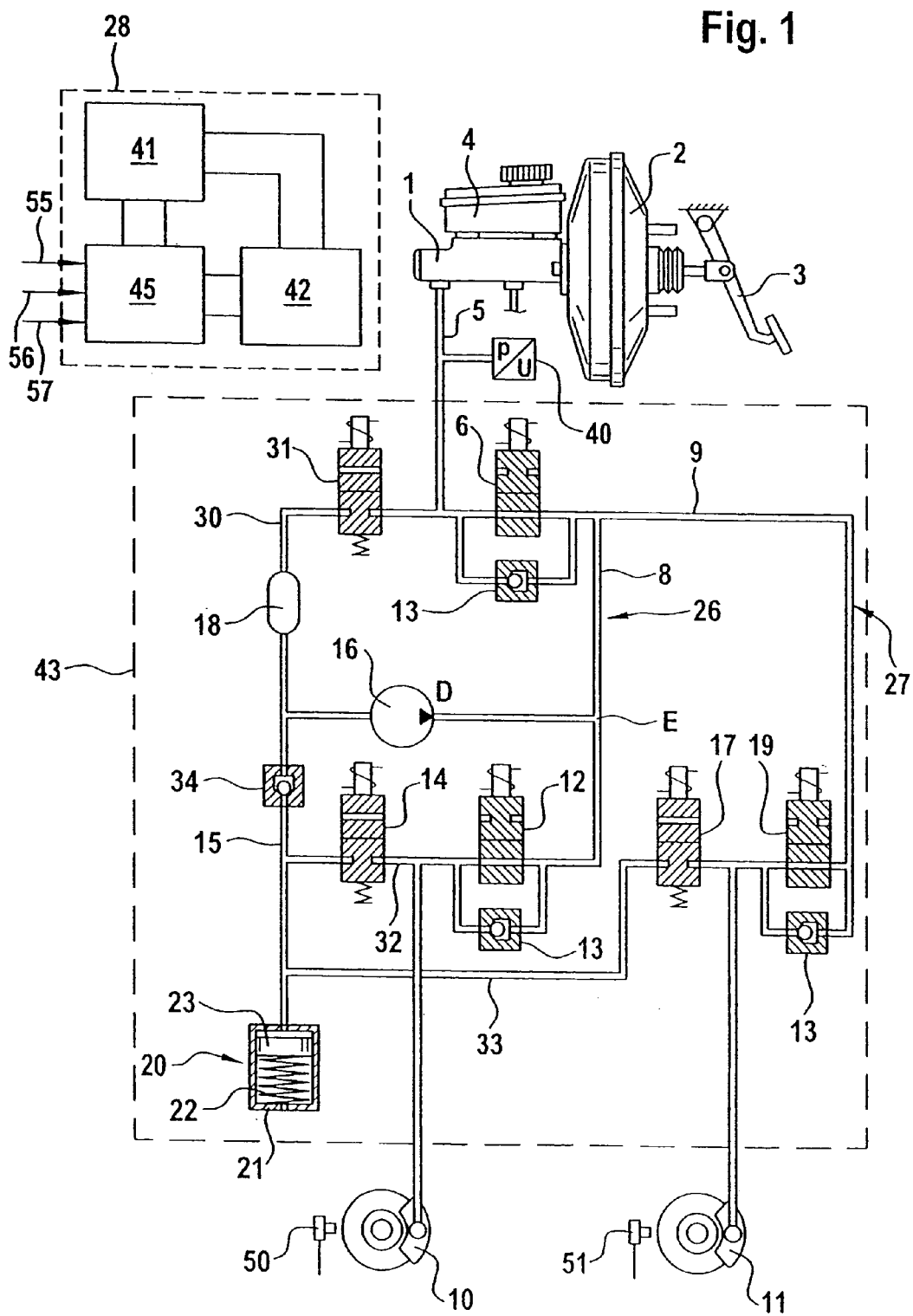
FIG. 1 is a view showing a brake system with two brake circuits.

The one brake circuit of a brake system for motor vehicles with two brake circuits as shown in FIG. 1 consists of an actuating unit 1, e.g. a brake cylinder, and a brake force booster 2 actuated by a brake pedal 3. Arranged at the actuating unit 1 is a supply tank 4 that contains pressure fluid volume and is connected to the working chamber of the actuating unit in the brake's release position. The one brake circuit shown includes a brake line 5 connected to a working chamber of the actuating unit 1 and containing a separating valve 6 that provides in its inactive position an open passage for the brake line 5. The separating valve 6 is typically actuated electromagnetically.

The brake line 5 branches into two brake lines 8, 9 respectively leading to a wheel brake 10, 11. Brake lines 8, 9 respectively contain an electromagnetically operable inlet valve 12, 19. Said valves are open in their inactive position and can be operated to adopt their closed position by energizing of the actuating magnet. Connected in parallel to each inlet valve 12, 19 is a non-return valve 13 that opens in the direction of the brake cylinder 1. A so-called return circuit that comprises return lines 15, 32, 33 with a pump 16 is connected in parallel to wheel brake circuits 26, 27. By way of each one outlet valve 14, 17 and through return lines 32, 33, the wheel brakes 10, 11 are connected to the return line 15 and, hence, to the suction side of the pump 16 whose pressure side is connected to the brake pressure line 8 in a mouth E between the separating valve 6 and the inlet valves 12, 19.

Pump 16 is designed as a reciprocating piston pump with a pressure valve (not shown) and a suction valve. A low-pressure accumulator 20, composed of a housing 21 with a spring 22 and a piston 23, is arranged at the suction side of the pump 16.

A biased non-return valve 34 opening towards the pump is interposed into the connection between the low-pressure accumulator 20 and the pump 16.

The suction side of the pump 16 is further connected to a low-pressure damper 18 by way of a suction line 30 and to the brake cylinder 1 by way of a change-over valve 31. In addition to the hydraulic unit 43, the brake force transmission circuit also includes a device 28 for controlling the brake system. Said device basically is an ESP control unit 45, associated with which is a model 41 for determining the nominal brake pressure and an accumulator 42 for storing the valve characteristic curve that describes the valve current and the corresponding difference in pressure at which the separating valve 6 opens. The pressure sensor 40 detecting the pressure of the actuating unit 1 is arranged in the brake line 5 between the brake cylinder 1 and the change-over valve 31 or the separating valve 6, respectively. Wheel speed sensors associated with the wheels are designated by reference numerals 50, 51. Input quantities that are sent to the ESP control unit 45, such as the signals of the rotational speed sensors, at least one yaw sensor, of one acceleration sensor or pressure sensor 40 are exemplarily designated by reference numerals 55 to 57.

The brake system operates as follows:

When braking, for example, the driver increases the brake pressure in the hydraulic unit 43 by way of the pedal 3 and the actuating unit 1 with the vacuum brake booster 2, without the vehicle decelerating corresponding to the pedal force. When braking by pedal depression, the device 28 evaluates the pressure of the actuating unit 1 determined by the pressure sensor 40 or the brake pressure introduced into the brake line 5. When the pressure reaches a limit value which describes the maximum boosting pressure of the actuating unit or the point of maximum boosting of the vacuum brake booster 2, the transition from the pneumatic brake force boosting by way of the vacuum brake booster 2 to the active brake force boosting by means of the pump 16, is carried out in particular according to the relation $P_{nominal} = P_{point\ of\ max.\ boosting} + \text{factor } K \times (P_{TMC} - P_{point\ of\ max.\ boosting})$, with $P_{nominal}$=nominal pressure, $P_{point\ of\ max.\ boosting}$=pressure at the point of maximum boosting of the brake booster, $P_{TMC}$=pressure of the actuating unit. To this end, the (analogized) separating valves 6 are closed in the pressure build-up with the change-over valve 31 open, and the hydraulic pump 16 delivers brake fluid out of the brake cylinder 1, e.g. a tandem master cylinder (TMC) into the wheel brakes 10, 11. The inlet valves 12 or 19, respectively, are open, while the outlet valves 14 or 17, respectively, are closed. In the pressure reduction phase, the additionally produced pressure is discharged through the analogized separating valves 6 into the brake cylinder 1 in a manner that is comfortable with respect to pedal feeling and braking effect.

Figure 2:
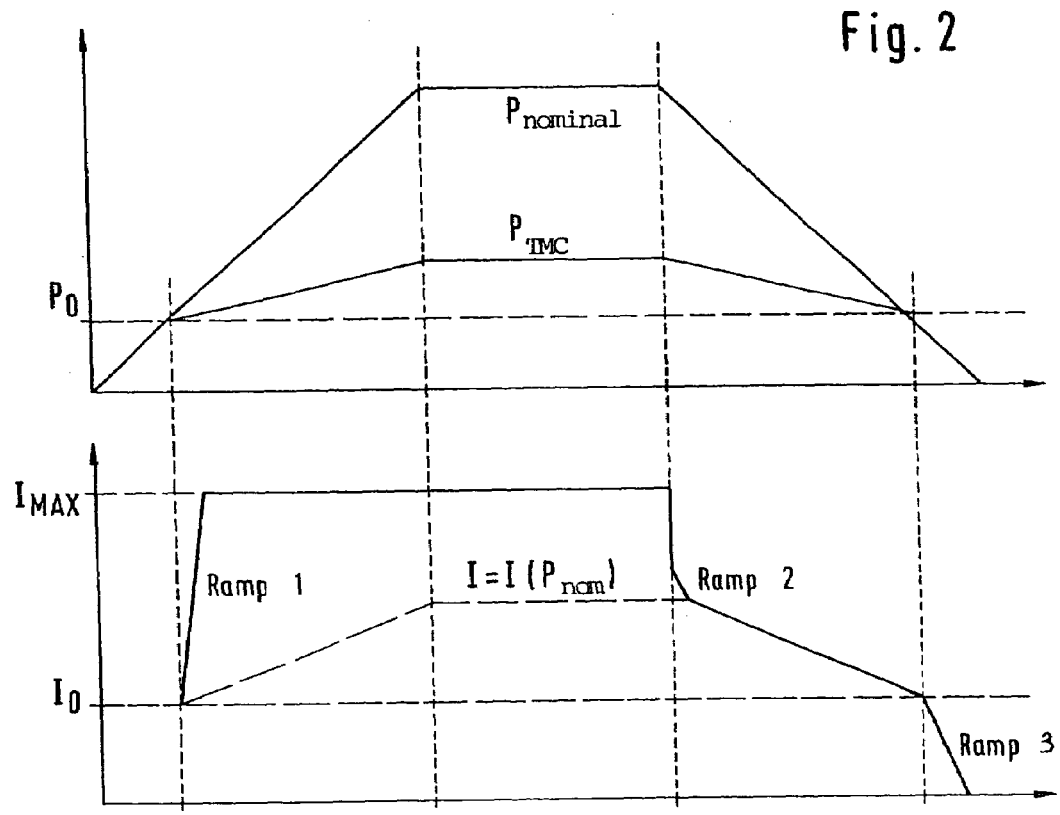
FIG. 2 is a schematic view of the signal variation of the actuating current of a hydraulic valve and the pressure according to the method of the invention.

FIG. 2 shows a schematic view of the signal variation of the actuating current $I_0$, I of the separating valve 6 and the differential pressure $P_0$, $P_{TMC}$, $P_{nominal}$.

This actuating current is determined from the difference between the nominal pressure $P_{nominal}$ for the wheel brakes 10, 11 and the measured pressure of the brake cylinder (TMC) 1. If a higher pressure prevails in the brake cylinders of the wheel brakes 10, 11, the separating valve 6 will open, and fluid propagates back into the brake cylinder 1 until the desired pressure has been adjusted in the hydraulic unit 43. When pressure balance prevails between the lines 5 and 8, 9 or between the inlet and outlet of the separating valve 6, the separating valve 6 will close and the pressure is maintained. To speed up the adjustment operation, the nominal pressure gradient of the brake pressure $P_{nominal}$ can be evaluated and, hence, the valve current I modified accordingly. This achieves a greater volume flow through the separating valve 6. This means, the reaction to quick pressure increase requirements is that the separating valve 6 is opened to a larger extent.

To actuate the separating valve 6, the valve characteristic curve 70 (FIG. 3) is stored in non-volatile memory 42 and describes the valve current $I_0$, I, $I_{max}$ and the corresponding pressure difference $P_0$, $P_{nominal}$, $P_{TMC}$, at which the separating valve 6 opens. Said characteristic curve 70 can be determined by a measurement of the valves or by a calibration at the end of the assembly line. The calibration at the end of the assembly line represents a favorable variant because the complete chain of influencing factors (drivers, coils, valve, etc.) is included in the stored characteristic curve at this point. Said characteristic curve permits controlling the pressure produced by actuation of the pump 16 in such a fashion that the desired hydraulic boosting can be adjusted to an appropriately greater accuracy without the driver being able to notice the difference compared to the controlled system (with wheel pressure sensors).

Principally, braking operations can be subdivided into the sections pressure increase, maintaining the pressure constant, and pressure reduction. In each of the braking cycles, two strategies are generally provided to regulate the brake pressure. According to the first strategy, the brake pressure follows the course of the characteristic curve 70, while the second strategy arranges for jump functions at the maximum actuating current or the actuating current represented by the characteristic curve.

I. Pressure Increase

Strategy A: The valve current I used to adjust the separating valve 6 is modified corresponding to the characteristic curve $I = I (P_{nominal})$ shown in FIG. 3.

Advantage: The pressure adjusted in wheel brakes 10, 11 is limited in its magnitude. When the pump 16 builds up too much pressure in at least one brake circuit, the portion in excess of the nominal pressure $P_{nominal}$ can flow off through the separating valve 6. This case can occur especially at the rear axle in brake systems with black-and-white circuit allotment.

Possibility B: Jump to the making current for differential pressure zero ($I_0$) and, subsequently, a quick ramp 1 to the maximum current $I_{max}$, according to the relation $I_{max}$=f ($P_{max}$, $P_{TMC}$, $P_{PLV}$)=min ($P_{max} - P_{TMC}$, $P_{PLV}$) with $P_{PLV}$=pressure limiting valve pressure shut off, $P_{max}$=maximum pressure in the brakes, $P_{TMC}$=pressure of the actuating unit. A zero point adjustment is required because the correlation between the pressure difference at the separating valve 6 and the current at which the separating valve 6 starts to open at this pressure difference is stored in the controller. Once open, the separating valve 6 will close due to hysteresis effects, such as friction, only when a lower pressure difference prevails again. To safely close an open separating valve 6 again, it must be energized corresponding to a pressure difference that is higher by a pressure value, e.g. 30 bar approximately.

Advantage: The separating valve 6 exhibits only low leakages. There are no closing noises.

Depending on the situation, the optimally suitable of the two strategies is chosen per brake circuit. Strategy A is used with greatly different volume characteristic curves, for example Systems with black-and-white circuit allotment With ESP—OHB (optimized hydraulic brake) superposition With ABS—OHB superposition In this arrangement, the maximum wheel pressure can be predefined, with the pump running.

Otherwise, strategy B is used to keep the separating valve 6 closed in the best possible manner.

II. Maintaining the Pressure Constant

Figure 3:
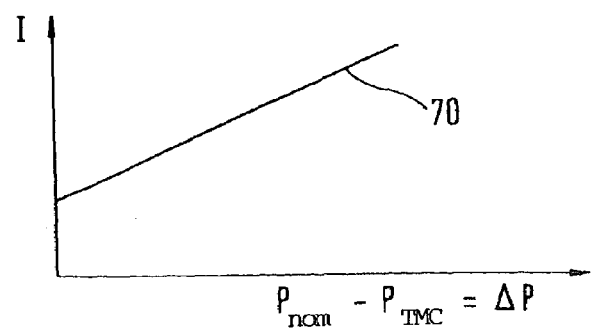
FIG. 3 is a characteristic curve of the invention.

Possibility A:

The valve current I used to adjust the separating valve 6 is modified corresponding to the characteristic curve I=I ($P_{nominal}$) illustrated in FIG. 3.

Advantage: The real pressure is limited in an upward direction. Excess pressure can be reduced. This may be necessary in the event of superposition with other control functions of the device 28 such as ESP, ABS, etc.

Possibility B:

The valve current remains at $I_{max}$.

Advantage: The valve is maximally seal-tight.

A pressure limitation of the hydraulic unit and the wheel brakes takes place at a predefined pressure of the pressure limiting valve. PLV pressure $P_{PLV}$ implies a pressure limitation that prevents a malfunction of the brake system or parts of the brake system. As this occurs, the separating valve 6 assumes a pressure limiting function according to the relation $I=I[min(P_{max}-P_{TMC}, P_{PLV})]$, and the separating valve 6 will open when the maximum pressure is exceeded, and pressure will discharge into the actuating unit 1. Below the maximum pressure, the separating valve 6 is being closed, or remains closed. The control unit 45 controls the separating valve 6 according to the differential pressures resulting in front of and behind the separating valve 6 or the pressure (behind the separating valve 6) in the hydraulic unit 43 and the wheel brakes 10, 11.

Figure 4:
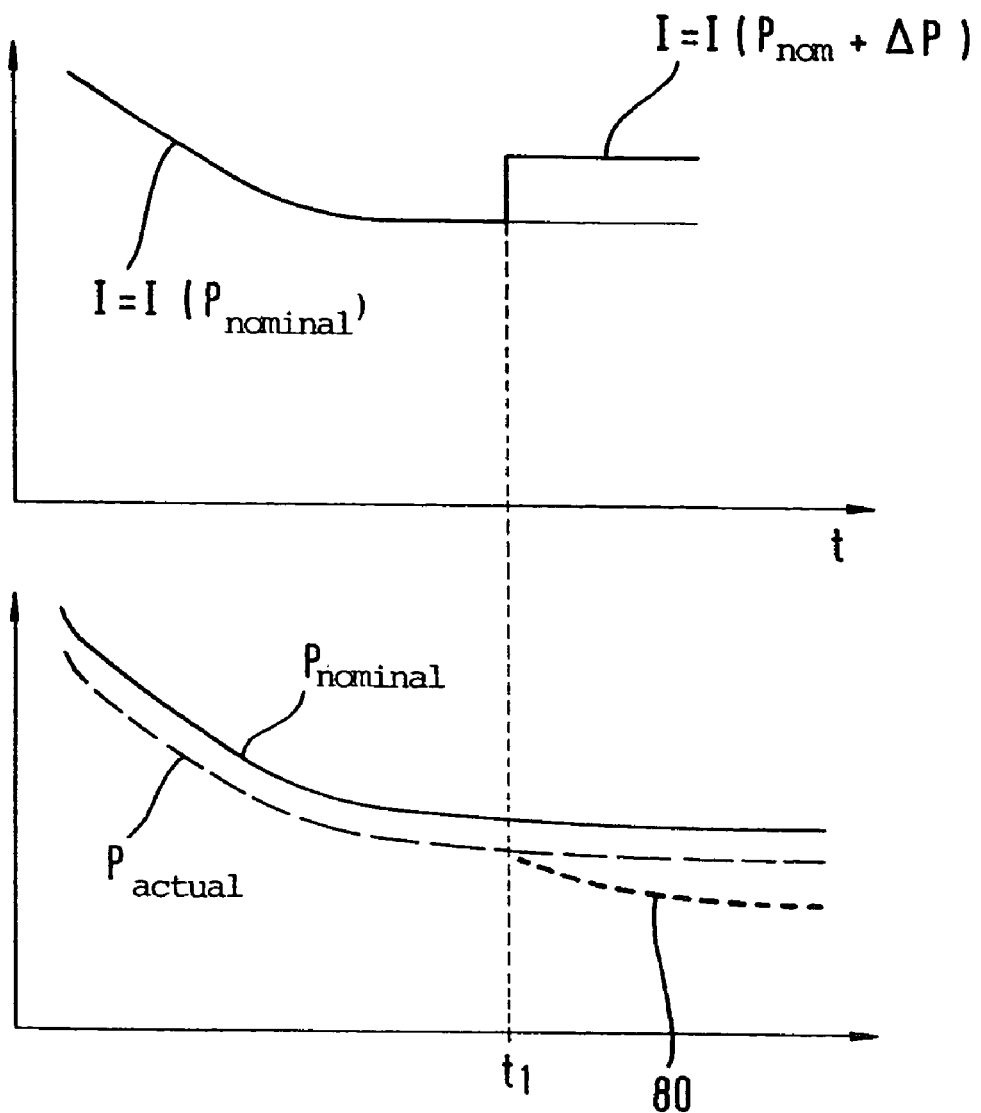
FIG. 4 is a schematic view of the signal variation of the actuating current with an additional energization.

Possibility C:

When equal or rising differences in nominal pressure are detected for a certain time or number of loops in strategy A, the separating valve 6 is energized corresponding to an additional pressure difference in order to close it. With decreasing nominal pressure differences, there is a switchback into the status according to strategy A: energization according to the nominal pressure. FIG. 4 depicts the variation of the nominal pressure $P_{nominal}$ and the variation of the actual pressure $P_{actual}$. The separating valve 6 is energized at time $t_1$ according to $I=I (P_{nominal}+\Delta P)$ in order to close it. The variation of $P_{actual}$ without this current increase, which would result due to leakages, is referred to by reference numeral 80.

III. Commencement of Pressure Reduction:

Possibility A:

Jump to the valve characteristic curve

Advantage: quick reaction

Possibility B:

Jump close to $I=I (P_{nominal}+\Delta P)$ of the valve characteristic curve. Thereafter follows a smooth, adapted transition by means of ramp 2 into or onto the valve characteristic curve, i.e. $I=I (P_{nominal})$ Advantage: errors of the characteristic curve will no longer be noticeable.

Termination of boosting, the pressure of the actuating unit 1 is the wheel pressure again.

Current ramp according to I=0 (ramp 3).

Ramps: They are advantageous because errors in the characteristic curves are not noticeable as an impact at the pedal but rather are removed by slow transitions that remain unnoticed. Further, noise development is greatly reduced.

The invention claimed is:

1. Method for regulating a predetermined modifiable brake pressure in the wheel brakes of a brake system which includes an actuating device and at least one hydraulic valve, the method comprising:

monitoring a pressure associated with the actuating device;

determining a nominal pressure for the wheel brakes based on the monitored actuating device pressure;

providing a characteristic curve that correlates a valve current of the hydraulic valve with a pressure difference between the nominal pressure for the wheel brakes and the monitored actuating device pressure;

determining the pressure difference between the nominal pressure for the wheel brakes and the monitored actuating device pressure; and comparing the determined pressure difference to the characteristic curve and determining a correcting variable of the hydraulic valve according to the characteritstic curve wherein the nominal pressure is determined according to the function $P_{nomnial}=P_{point\ of\ max.\ boosting}+$ factor K $\times P_{TMC}-P_{point\ of\ max.\ boosting}$) with $P_{nomnial}=$nominal pressure, $P_{point\ of\ max.\ boosting}=$pressure at the point of maximum boosting of an associated brake booster and $P_{TMC}=$pressure of the actuating device.

2. Method as claimed in claim 1, wherein at least two strategies are provided for regulating the brake pressure, the valve current following the course of the characteristic curve according to the first strategy, while the second strategy arranges for jump functions at the maximum actuating current or the actuating current represented by the characteristic curve.

3. Method as claimed in claim 2, wherein the maximum actuating current of the separating valve is limited according to the function $I_{max}=f(P_{max}, P_{TMC}, P_{PLV})$.

4. Method as claimed in claim 3, wherein the separating valve is opened when the pressure in the hydraulic unit and the wheel brakes or a differential pressure produced from the pressure in front of and behind the separating valve exceeds a predefined value ($P_{PLV}$).

5. Method as claimed in claim 2, wherein the maximum actuating current of the separating valve is limited according to the function $I_{max}=min(P_{max}, P_{TMC}, P_{pLv})$.

6. Method as claimed in claim 1, wherein the correcting variable is an electric valve current used to control the hydraulic valve in analog manner.

7. Device for implementing the method as claimed in claim 1, wherein the variable brake pressure generated by actuation of a pump is controlled in such a way that a desired hydraulic boosting is achieved in each brake circuit.

8. Method as claimed in claim 1 wherein $P_{point\ of\ max.\ boosting}$ is a predetermined value and nomial pressure values are stored for look up based on the monitored actuating device pressure.

* * * * *